United States Patent
Hartman et al.

[11] Patent Number: 6,024,128
[45] Date of Patent: Feb. 15, 2000

[54] VALVE ASSEMBLY WITH INTEGRAL PHASE REGENERATOR

[76] Inventors: Brian T. Hartman, 2253 E. Contessa Cir., Mesa, Ariz. 85213; Thomas A. Hartman, 700 Capac Ct., St. Louis, Mich. 63125

[21] Appl. No.: 09/166,889

[22] Filed: Oct. 5, 1998

[51] Int. Cl.[7] .................................................. F16K 47/02
[52] U.S. Cl. ........................ 137/888; 137/599.1; 251/311
[58] Field of Search ............................... 137/599, 599.1, 137/888, 892, 893, 895; 251/311

[56] References Cited

U.S. PATENT DOCUMENTS 2,725,891  12/1955  Bourguignon et al. .
5,509,787   4/1996  Valdes .

OTHER PUBLICATIONS

Metropolitan Water District of Southern California, Report No. 854, Oct. 1968.
Metropolitan Water District of Southern California, Report No. 855, Jun. 1969.

*Primary Examiner*—Stephen M. Hepperle
*Attorney, Agent, or Firm*—Howell & Haferkamp, L.C.

[57] ABSTRACT

A valve assembly comprises a valve body, a valve plug and a pressure regulating conduit (phase regenerator). The valve body has an upstream opening, a downstream opening, and a hollow interior between the upstream and downstream openings. The hollow interior of the valve body is defined by an interior surface of the valve body. The valve plug is mounted within the hollow interior of the valve body. The valve plug is moveable relative to the valve body between a closed position and an open position. The valve plug is adapted for engagement with the valve body in a manner to prevent fluid flow through the valve body when the valve plug is in the closed position. The valve body is adapted to permit fluid flow in a downstream direction through the valve body, from the upstream opening to the downstream opening, when the valve plug is in the open position. The pressure regulating conduit is connected to the valve body and is adapted to introduce a gas into the hollow interior of the valve body. The pressure regulating conduit has a discharge end that extends into the hollow interior of the valve body.

21 Claims, 8 Drawing Sheets

VALVE ASSEMBLY WITH INTEGRAL PHASE REGENERATOR

BACKGROUND OF THE INVENTION

This invention relates generally to the valve art and, more particularly, to valve assemblies designed to minimize or eliminate cavitation and vapor formation caused by a pressure drop across the valve assembly.

The phenomenon of cavitation in valves has been a constraint in their application for many years. In some cases, valves are called upon to withstand large pressure head drops under high-velocity, high-flow conditions. However, in such cases, if local pressures within the valve drop below the vapor pressure of water, cavitation can result and cause serious performance problems.

In most cases, valves provide a physical constriction in the flow of fluid through a hydraulic system. In general, the velocity of the fluid increases as it passes through the constriction because the flow area (i.e., the cross-sectional area) at the constriction is smaller than the flow area just upstream and just downstream of the constriction. This increase in velocity is accompanied by a decrease in pressure. If the differences in velocity are considerable, the pressure drop can also be considerable. In high-velocity high-flow situations, low-pressure regions tend to occur just downstream of the valve. If flow rates are high enough, these regions are likely to initiate cavitation.

The mechanism for cavitation entails the formation of small vapor nuclei, their subsequent growth within low-pressure regions of a flow, and their violent collapse as they eventually enter regions of higher pressure. The energy released by the collapse of the vapor cavities typically causes noise and vibration within a hydraulic system. Strong cavitation near physical boundaries (e.g., valve or pipe walls) can, over a period of time, cause serious damage or even failure of system components. Regions of low pressure in valves typically occur immediately downstream from an abrupt change in a valve's interior geometry. The flow in these regions tends to be highly turbulent with numerous eddies.

Attempts have been made to minimize or eliminate the occurrence of cavitation caused by significant pressure drops across valves. For example, decades ago, experiments were conducted wherein water recirculation manifolds were built into the downstream side of partially open conical-plug valves in an effort to minimize cavitation. The premise was that the low-pressure high-velocity flow downstream of the throttling cone valve would "suck" water through the passages of the manifold an into the outlet side of the valve body, thereby raising the pressure of the water at the downstream side of the valve so as to minimize or eliminate cavitation. However, testing showed that these water recirculation manifolds provided no significant benefit. Metropolitan Water District of Southern California, Report No.854 (October 1968) and Report No.855 (June 1969).

One problem with these water recirculation manifolds is that they were installed on the downstream side of the partially open valve in the area of stagnant flow, 180 degrees opposite the area of the high-velocity flow discharging from the partially open valve (the lower part of the pipe shown in the accompanying figures). Consequently, the manifolds provided no significant benefit because they were not located in the area where cavitation is most likely to occur (i.e., the area of high-velocity low-pressure flow). The manifolds were not installed in the area of high-velocity flow (the area adjacent the upper part of the pipe shown in the accompanying figures) because doing so would have produced reverse flow and ram pressure in the manifold due to the angled impact of the throttled valve flow against the holes of the manifold. The holes of these manifolds were flush with the interior surface of the valve body. Consequently, they would have produced negligible benefits, regardless of whether their location was in the area of high-velocity flow discharging from the partially open valve or in the area of stagnant flow.

Other attempts to minimize the occurrence of cavitation involved recirculation manifolds connected to atmospheric air. The premise, as with the water recirculation manifolds, was that the low-pressure high-velocity flow downstream of the throttling cone valve would "suck" atmospheric air through the passages of the manifold and into the outlet side of the valve body, thereby raising the pressure of the water at the downstream side of the valve so as to minimize or eliminate cavitation. However, similar problems were encountered and testing showed no significant benefits. Again, the manifolds were installed on the downstream side of the partially open valve in the area of stagnant flow, 180 degrees opposite the area of the high-velocity flow discharging from the partially open valve. Consequently, they provided no significant benefit because they were not located in the area of high-velocity low-pressure flow. The air manifolds were not installed adjacent the area of high-velocity flow, again because of the problem of reverse flow and ram pressure due to the angled impact of the throttled valve flow against the holes of the manifold, which were flush with the interior of the valve body.

SUMMARY OF THE INVENTION

The shortcomings of the prior art are overcome by the present invention, which provides an improved valve assembly having an integral pressure regulating conduit (also referred to by the inventor as a "phase regenerator") that minimizes or eliminates the formation of cavitation caused by the pressure drop across the valve when subjected to high-velocity high-flow conditions. In general, a valve assembly of the present invention comprises a valve body, a valve plug and a pressure regulating conduit. The valve body has an upstream opening, a downstream opening, and a hollow interior between the upstream and downstream openings. The hollow interior of the valve body is defined by an interior surface of the valve body. The valve plug is mounted within the hollow interior of the valve body. The valve plug is moveable relative to the valve body between a closed position and an open position. The valve plug is adapted for engagement with the valve body in a manner to prevent fluid flow through the valve body when the valve plug is in the closed position. The valve body is adapted to permit fluid flow in a downstream direction through the valve body, from the upstream opening to the downstream opening, when the valve plug is in the open position. The pressure regulating conduit is connected to the valve body and is adapted to introduce a gas into the hollow interior of the valve body. The pressure regulating conduit has a discharge end that extends into the hollow interior of the valve body.

In another aspect of the invention, a valve assembly includes a valve body, a valve plug and a pressure regulating conduit. The valve plug and the valve body are adapted to direct a flow of fluid in a downstream direction from the upstream opening to the downstream opening along a fluid flow path when the valve plug is in the open position. The pressure regulating conduit is mounted to the valve body and is adapted to introduce a gas into the hollow interior of the valve body. The pressure regulating conduit has a discharge end that is positioned within the fluid flow path.

Other advantages and features of the invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

A valve assembly of the present invention is represented generally by the reference numeral 20 in FIGS. 1 through 6. The particular valve assembly illustrated is a spherical plug valve. Spherical plug valves, in general, are well known in the art. The spherical plug valve is a species of plug valve that does not necessarily have a spherical plug. Other types of plug valves have plugs with a cylindrical shape, a conical shape, or some other shape. Although the problem of cavitation due to sharp pressure drops is not limited to plug valves, for the sake of consistency and clarity, this specification describes the present invention in the context of a spherical plug valve. It will be appreciated that the present invention could be employed in connection with other types of valve assemblies for purposes of minimizing or eliminating cavitation, without departing from the scope of the present invention.

In general, the valve assembly 20 shown in the Figures includes a valve body, represented generally by the reference numeral 22, a valve plug 24 and a pressure regulating conduit 26 ("phase regenerator"). The valve body 22 is comprised of an upstream section 30, a middle section 32 and a downstream section 34. The upstream section 30 of the valve body 22 includes an upstream opening 36. Preferably, each of these sections is generally cylindrical. The upstream section 30 is adapted for connection to an upstream pipe 38 and, preferably has an interior diameter that matches an interior diameter of the upstream pipe 38. The downstream section 34 of the valve body 22 includes a downstream opening 40. The downstream section 34 is adapted for connection to a downstream pipe 42 and, preferably has interior diameter that matches an interior diameter of the downstream pipe 42. The valve body 22 has a hollow interior between the upstream and downstream openings 36 and 40. The hollow interior of the valve body 22 (which includes the upstream section 30, the middle section 32 and the downstream section 34) is defined by an interior surface 44 of the valve body 22.

Figure 4:
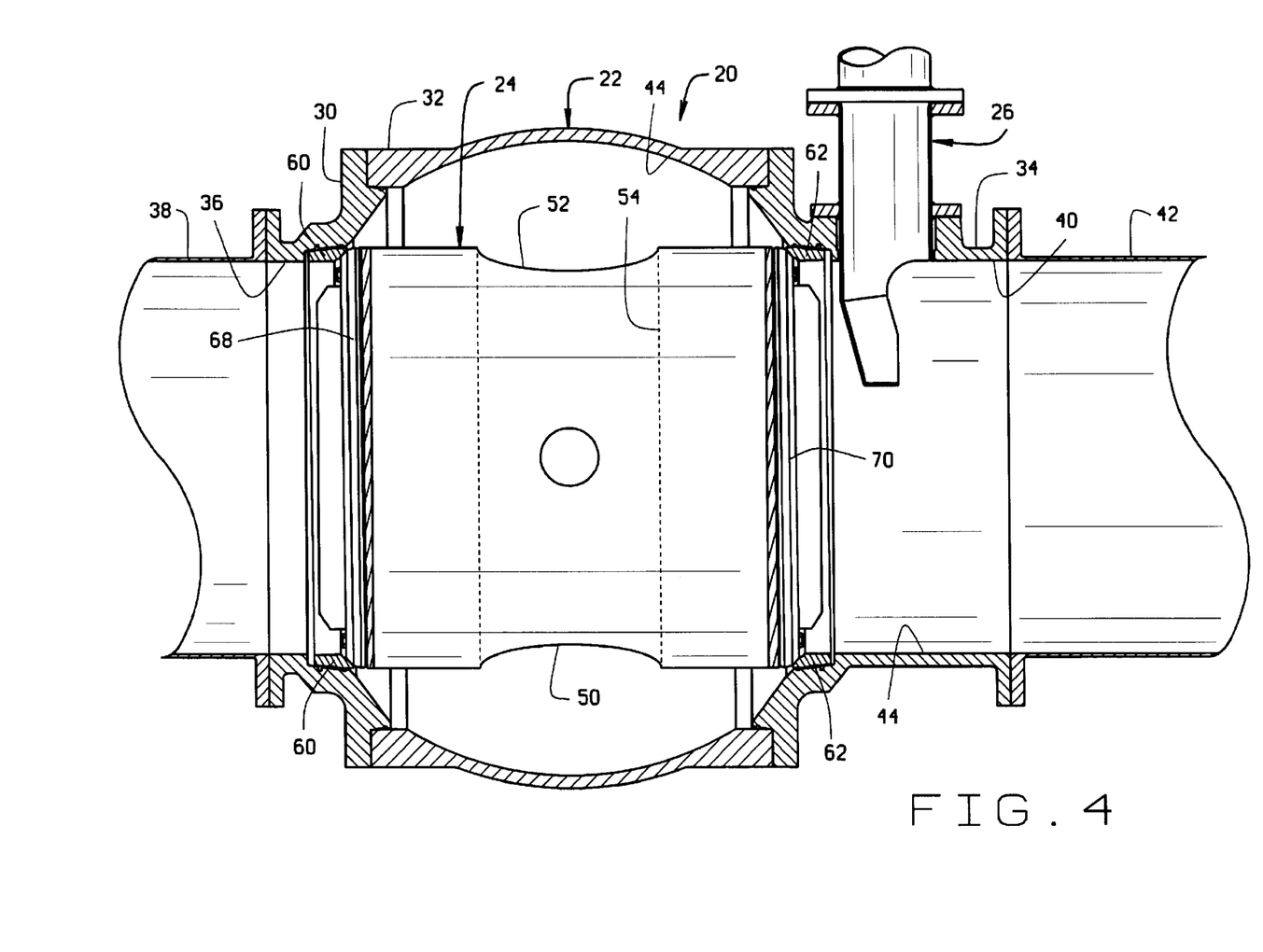
FIG. 4 is a cross-sectional side view of the valve assembly taken along the plane of line 4—4 in FIG. 2, with the valve shown in the closed position.
Figure 5:
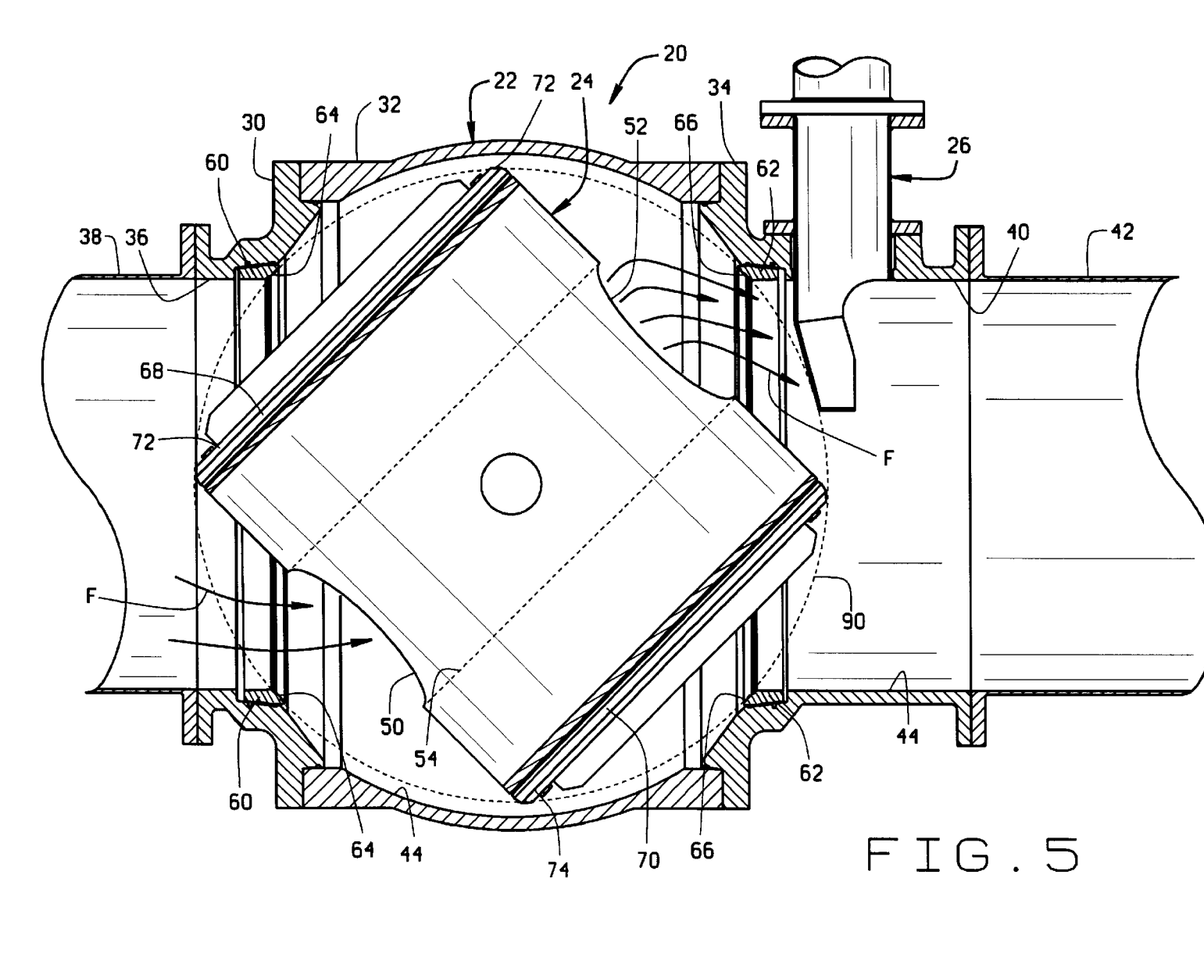
FIG. 5 is a cross-sectional side view of the valve assembly similar to FIG. 4, but with the valve shown in a partially open position.
Figure 6:
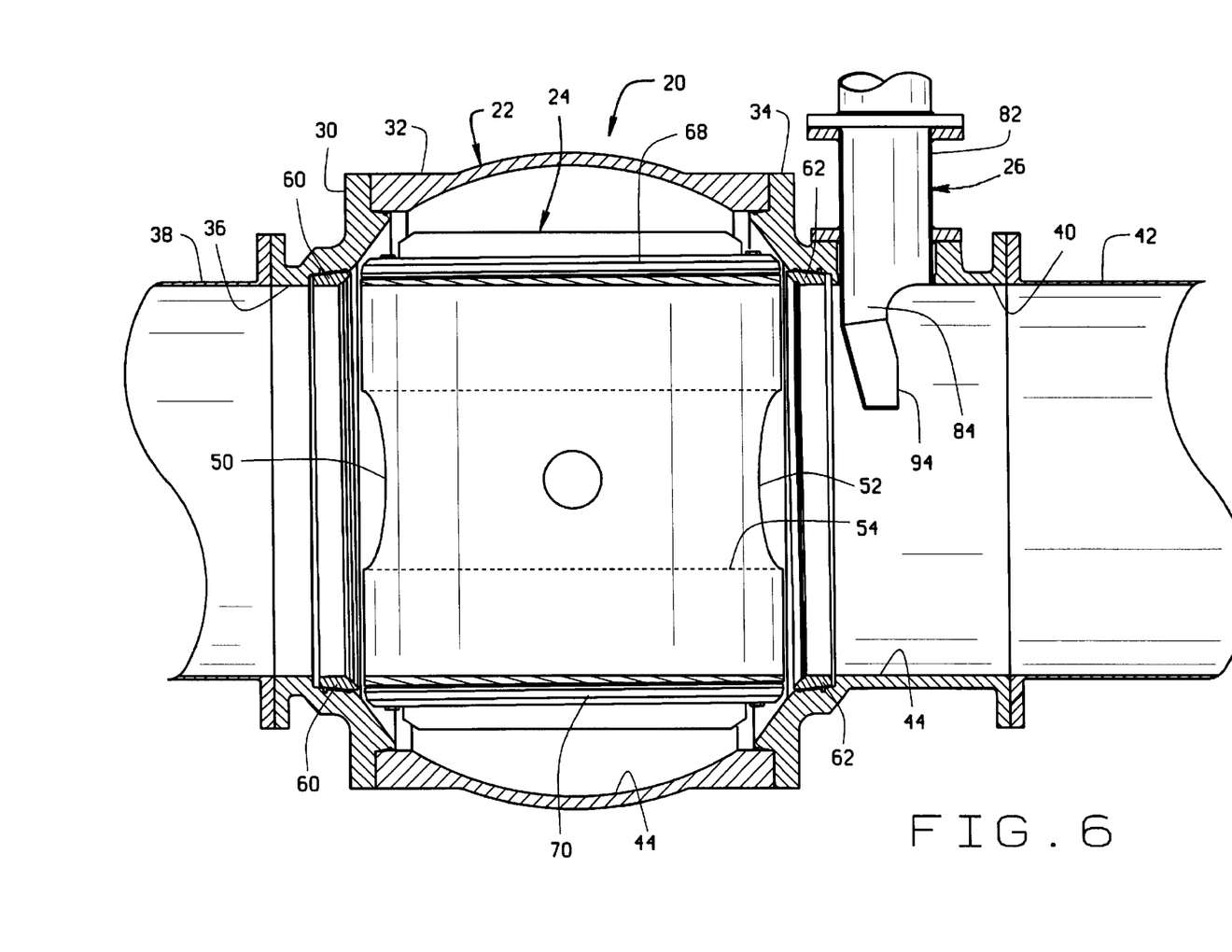
FIG. 6 is a cross-sectional side view of the valve assembly similar to FIGS. 4 and 5, but with the valve shown in a fully open position.

The valve plug 24 is rotatably mounted within the hollow interior of the valve body 22 for rotating movement relative to the valve body 22 about an axis of rotation between a closed position (see FIG. 4) and an open position (see FIGS. 5 and 6). As is well known in the art, the valve plug 24 is connected by a shaft 45 to a drive mechanism 46 (see FIGS. 1–3) for rotating the valve plug between the open and closed positions. The valve plug 24 has an inlet port 50, a discharge port 52, and a generally cylindrical passage 54 through the valve plug 24 connecting the inlet port 50 and the discharge port 52. Preferably, the cylindrical passage 52 has a center axis that is generally perpendicular to the axis of rotation of the valve plug 24.

As shown in FIG. 4, the valve plug 24 is adapted for engagement with the valve body 22 in a manner to prevent fluid flow through the valve body 22 when the valve plug 24 is in the closed position. The valve body 22 includes a first generally annular valve seat 60 that surrounds the upstream opening 36 of the valve body 22 and a second generally annular valve seat 62 that surrounds the downstream opening 40 of the valve body 22. Preferably, the first valve seat 60 has a first generally frustoconical seating surface 64 and the second valve seat 62 has a second generally frustoconical seating surface 66 (see FIG. 5).

The valve plug 24 includes a first generally annular sealing member 68 on one side of the plug 24 and a second generally annular sealing member 70 on an opposite side of the plug 24. The center axes of the first and second sealing members 68 and 70 are substantially orthogonally located with respect to the axis of the cylindrical passage 54 of the valve plug 24 and the axis of rotation of the valve plug 24. Preferably, the first sealing member 68 has a first generally frustoconical sealing surface 72 and the second sealing member 70 has a second generally frustoconical sealing surface 74 (see FIG. 5). Referring again to FIG. 4, the first sealing surface 72 of the first sealing member 68 is adapted for sealing engagement with the first seating surface 64 of the first valve seat 60, and the second sealing surface 74 of the second sealing member 70 is adapted for sealing engagement with the second seating surface 66 of the second valve seat 62, when the valve plug 24 is in the closed position. As shown in FIGS. 5 and 6, the sealing members 68 and 70 are disengaged from the valve seats 60 and 62 when the valve plug 24 is in the open position.

Thus, in operation, the valve assembly 20 is fastened to the upstream pipe 38 and the downstream pipe 42. Fluid flows in the downstream direction from the upstream pipe 38 to the downstream pipe 42 through the valve body 22 when the valve plug 24 is in the open position shown in FIGS. 5 and 6. When the valve plug 24 is in the closed position shown in FIG. 4, the fluid is prevented from flowing from the upstream pipe 38 to the downstream pipe 42. In the open position, fluid flows along a fluid flow path from the upstream pipe 38 through the upstream opening 36 of the valve body 22, then through the cylindrical passage 54 of the valve plug 24 from the inlet port 50 to the discharge port 52, and finally through the downstream opening 40 of the valve body 22 to the downstream pipe 42. Although some fluid may flow around the valve plug 24 instead of through it when in the open position, the majority of the flow will be through the passage 54 as it is the path of least resistance. In the closed position, the sealing surfaces 72 and 74 of the sealing members 68 and 70 engage with the seating surfaces 64 and 66 of the valve seats 60 and 62 to prevent fluid flow through the valve.

The pressure regulating conduit 26 is connected to the valve body 22, and preferably passes through a wall of the valve body 22. An inlet end 82 of the conduit 26 extends to an exterior of the valve body 22 and a discharge end 84 of the conduit 26 extends into the hollow interior of the valve body 22. As explained below, it is critical that the discharge end 84 of the conduit 26 extend inwardly so as to protrude into the hollow interior of the valve body 22 beyond the interior surface 44. The conduit 26 serves to put the hollow interior of the valve body 22 in fluid communication with atmospheric air surrounding the exterior of the valve body 22. Thus, the conduit 26 provides a route for atmospheric air to enter into the flow of fluid.

The flow of air at atmospheric pressure into the interior of the valve body 22 at low-pressure regions of the flow serves to raise the pressure of the flow. The low pressure of the vapor phase of the high-velocity water is immediately raised to the atmospheric pressure of the incoming air, and the vapor phase of the water is "regenerated" into the liquid phase, with few air or gas bubbles forming, expanding, and collapsing in the discharging flow. By positioning the pressure regulating conduit 26 at the region where vapor nuclei would otherwise begin to form as a result of low pressure, cavitation is minimized or, ideally, prevented altogether. The fluid pressure in this region is raised by the addition of the atmospheric air, and any vapor nuclei that do form will not have an opportunity to grow before entering regions of higher pressure. It is therefore preferable to position the discharge end 84 of the conduit 26 within, or as close as possible to, the region of lowest fluid pressure.

As shown in FIGS. 4–6, the pressure regulating conduit 26 is preferably mounted to the valve body in a manner so that the discharge end 84 is positioned between the valve plug 24 and the downstream opening 40 of the valve body 22. More preferably, the discharge end 84 of the conduit 26 is positioned in an area adjacent the downstream side of the second valve seat 62. It is this general area, just downstream of the physical constriction provided by the valve plug 24, and particularly when the valve plug 24 is only partially open as shown in FIG. 5, where cavitation is most likely to occur. In an alternative embodiment of a plug valve having only one valve seat adjacent the upstream opening of the valve body, and one sealing member at the upstream end of the valve plug, the discharge end 84 of the conduit 26 is preferably positioned in an area adjacent the discharge port 52 of the valve plug 24.

Referring again to FIGS. 4–6, as the valve plug 24 rotates between its open and closed positions, the sealing members 68 and 70 of the valve plug 24 follow a generally arcuate operating path, which is represented by the reference numeral 90 in FIG. 5. It can be seen in FIG. 5 that the arcuate operating path 90 intersects a plane defined by the second valve seat 62 so that a portion of the path 90 is actually downstream of the plane. As the valve plug 24 rotates between its open and closed positions, the second sealing member 70 of the valve plug 24 follows the arcuate operating path 90 through the portion of the path that is downstream of the plane defined by the second valve seat 62. Thus, the pressure regulating conduit 26 must be positioned downstream of the arcuate operating path 90 so as not to interfere with the movement of the valve plug 24 between its open and closed positions. Again, it is desirable to position the discharge end 84 of the conduit 26 as close as possible to the region of lowest fluid pressure. Accordingly, the discharge end 84 of the pressure regulating conduit 26 is preferably positioned immediately downstream of the arcuate operating path 90.

When the valve plug 24 is only partially open (as shown in FIG. 5), the cross-sectional area of the flow is smallest just downstream of the discharge port 52 of the valve plug adjacent the second valve seat 62. This creates a venturi effect, which results in the fluid in this region having the highest velocity. The arrows in FIG. 5, which are represented by the reference character F, indicate the general direction of fluid flow through the valve assembly 20. When the valve plug 24 is in the partially open position shown in FIG. 5, the discharge port 52 of the valve plug 24 is facing generally upwardly and slightly downstream. Therefore, when the valve plug 24 is in this partially open position, the fluid flow issuing from the discharge port 52 of the valve plug 24 enters the downstream section 34 of the valve body 22 at a high velocity along an upper portion of the downstream section 34. Again, it is preferable to position the discharge end 84 of the conduit 26 within, or as close as possible to, the region of lowest fluid pressure and highest fluid velocity. Accordingly, the pressure regulating conduit 26 is preferably positioned at an upper portion of the downstream section 34 of the valve body 22 so that the discharge end 84 of the conduit 26 is within the fluid flow path.

The pressure regulating conduit 26 includes a discharge opening 94 at the discharge end 84. As shown in FIGS. 4–6, the discharge end 84 is preferably configured so that the discharge opening 94 generally faces in the downstream direction. This configuration, with the discharge opening 94 facing downstream, allows for a substantially seamless interface between the high-velocity low-pressure flow issuing from the discharge port 52 of the valve plug 24 through the downstream opening 40 of the valve body 22 and the atmospheric air entering the interior of the valve body 22 through the pressure regulating conduit 26. This configuration also prevents ramming of flow up the conduit 26, a disadvantage of the prior art.

Figure 1:
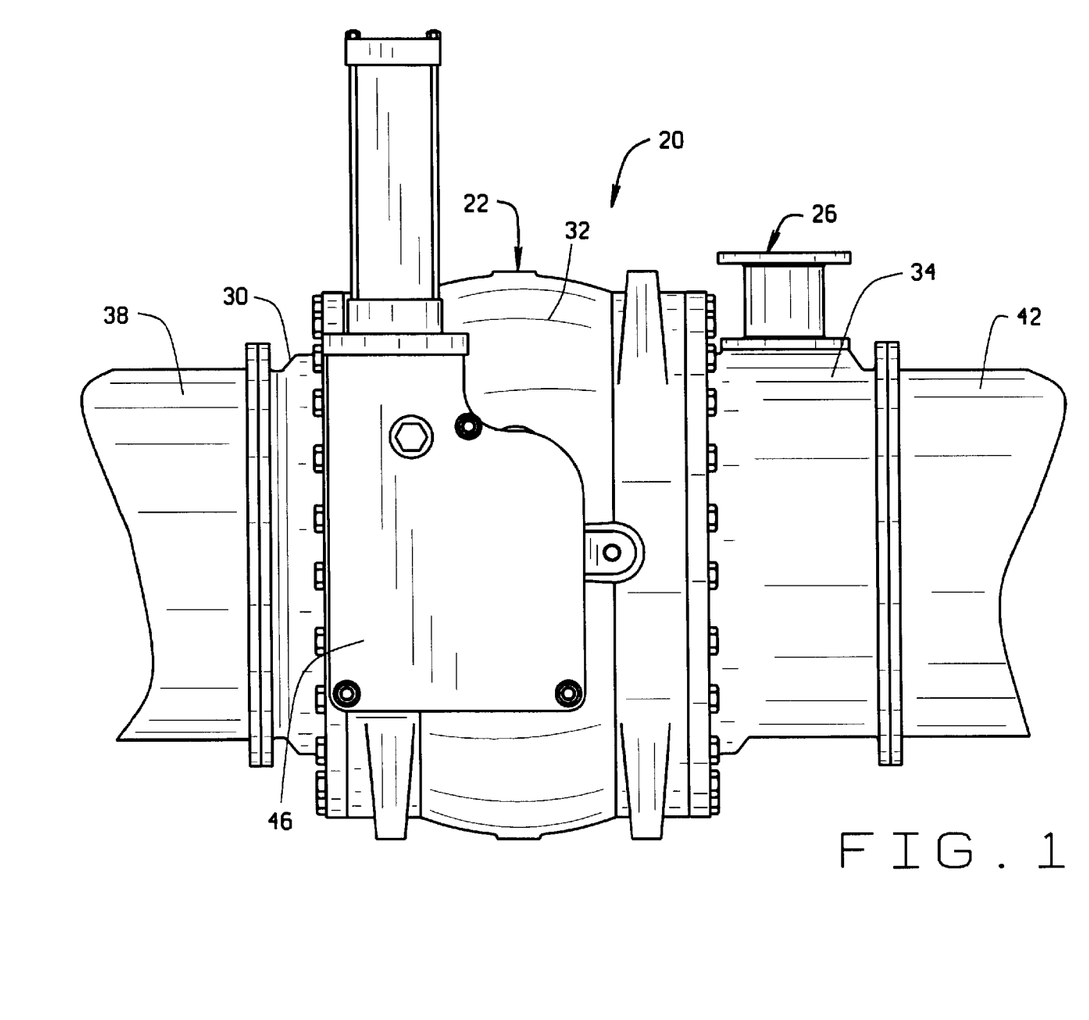
FIG. 1 is a side elevation view of a valve assembly of the present invention.
Figure 2:
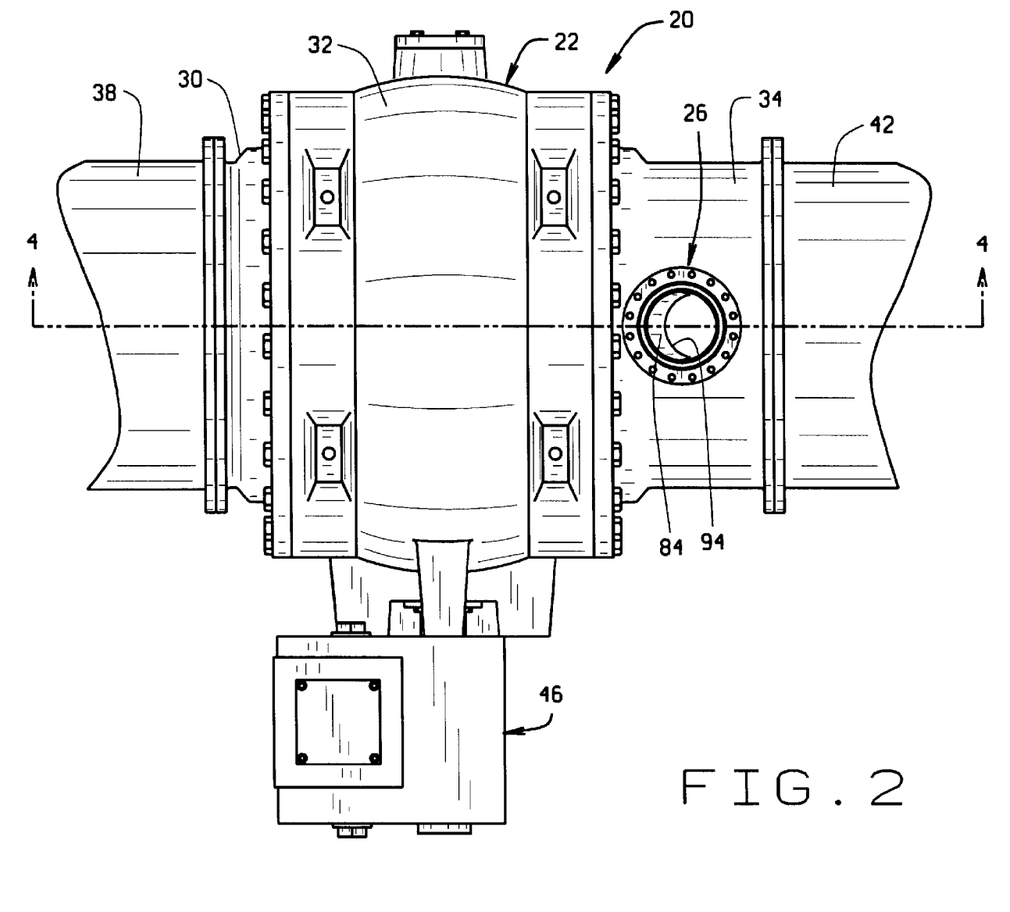
FIG. 2 is a top plan view of the valve assembly of FIG. 1.
Figure 3:
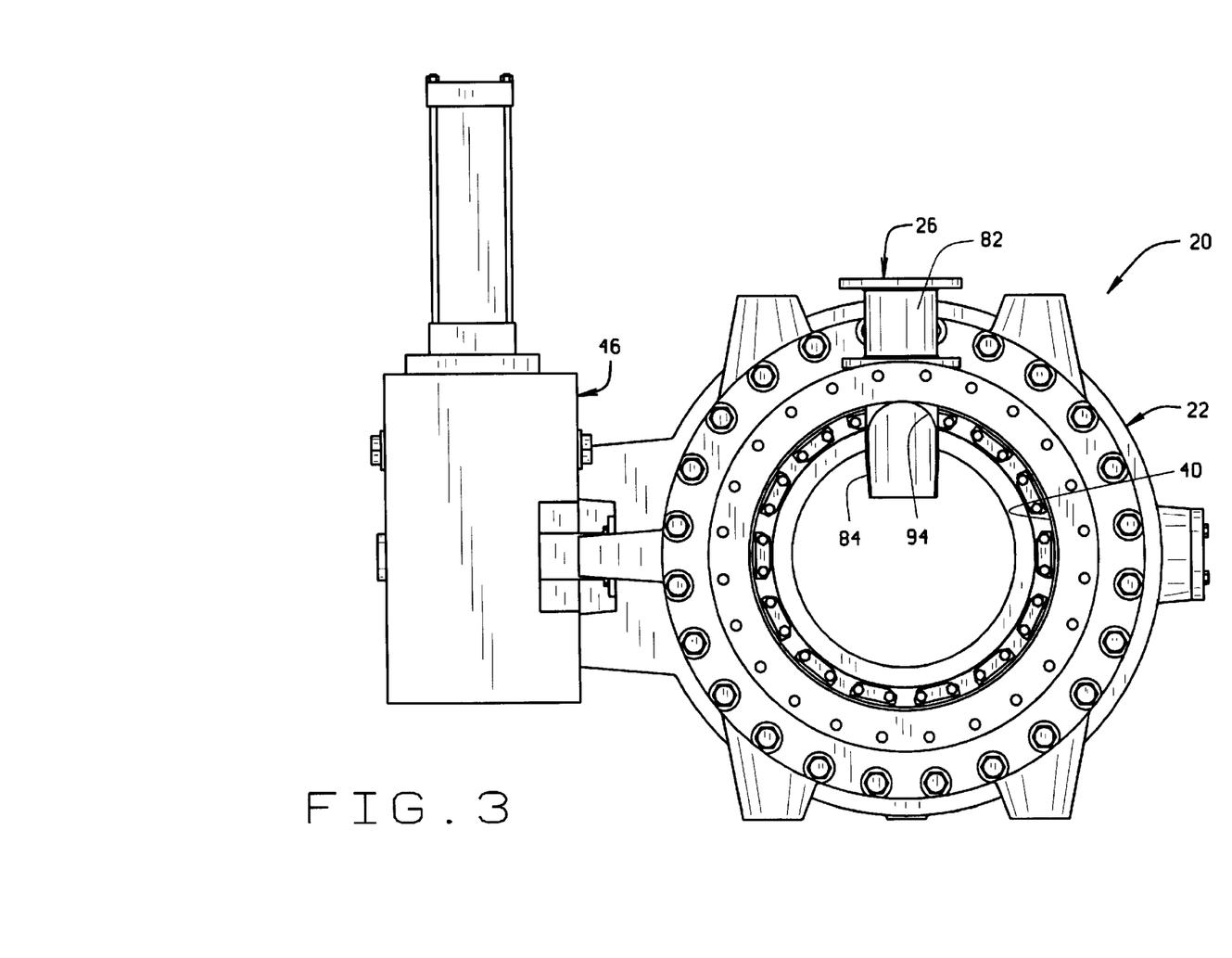
FIG. 3 is an end view of the valve assembly of FIG. 1, viewed from the downstream end and looking upstream.
Figure 7:
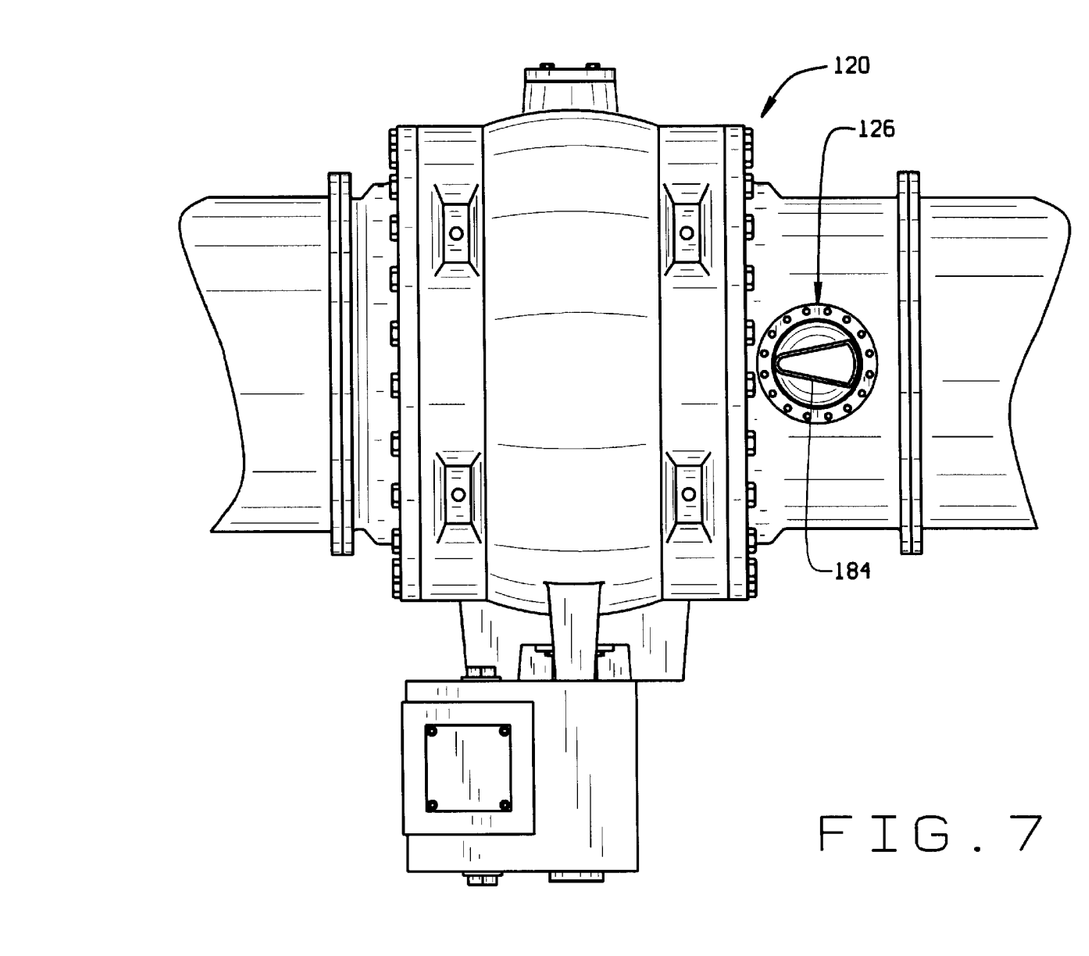
FIG. 7 is a top plan view of an alternative embodiment of a valve assembly of the present invention including a pressure regulating conduit with a discharge end having a generally V-shaped cross sectional configuration.

In the valve assembly 20 of FIG. 2, it can be seen that the discharge end 84 of the pressure regulating conduit 26 has a generally U-shaped cross-sectional configuration when viewed from above. In an alternative embodiment of a valve assembly 120 shown in FIG. 7, a discharge end 184 of a pressure regulating conduit 126 has a generally V-shaped cross-sectional configuration when viewed from above. Depending on flow conditions, one configuration may be more desirable than the other. In general, the conduit 26 with the generally U-shaped discharge end 84 will provide more resistance to the flow of fluid past the discharge end 84 of the conduit 26. This resistance will provide some degree of back-pressure to the flow entering the valve body 22 through the upstream opening 36, and thereby lowers the cavitation index at that location.

Figure 8:
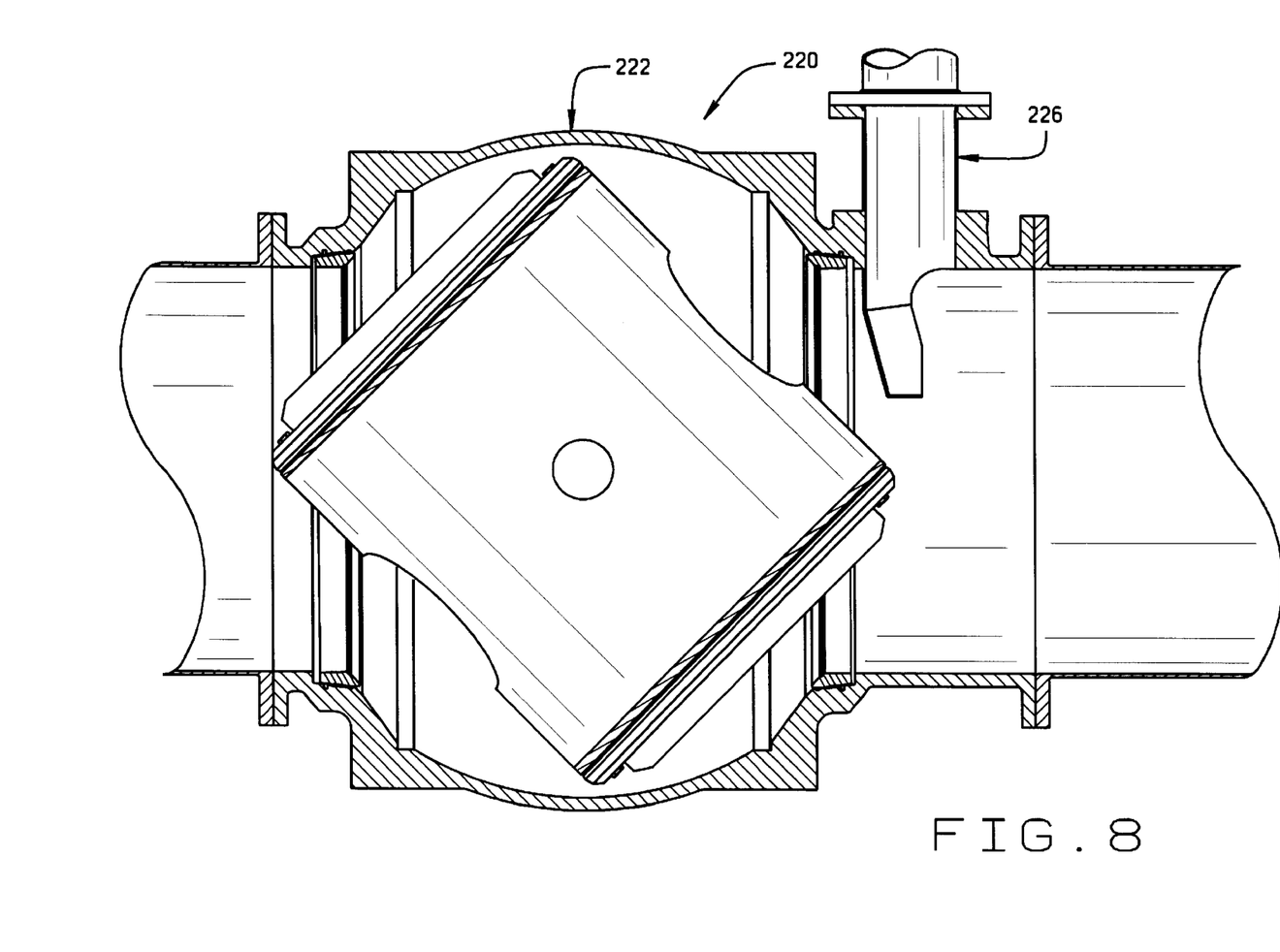
FIG. 8 is a cross-sectional side view of an alternative embodiment of a valve assembly of the present invention wherein the pressure regulating conduit and the valve body are of a monolithic construction.

The pressure regulating conduit 26 shown in FIGS. 1–6 is cast separately from the valve body 22 and is preferably fastened thereto with mechanical fasteners (not shown). FIG. 8 is a cross-sectional side view of an alternative embodiment of a valve assembly 220 of the present invention wherein the pressure regulating conduit 226 and the valve body 222 are of a monolithic construction (i.e., the pressure regulating conduit 226 and the valve body 222 are of a single-piece construction).

In view of the above, it will be seen that the problems with the prior art have been overcome and other advantageous results have been attained. As various changes could be made without departing from the scope of the invention, it is intended that all matter contained in the above description or shown in the accompanying drawings shall be interpreted as illustrative and not in a limiting sense.

What is claimed is:

1. A valve assembly comprising:
   a valve body having an upstream opening, a downstream opening, and a hollow interior between the upstream and downstream openings, the hollow interior being defined by an interior surface of the valve body;
   a valve plug mounted within the hollow interior of the valve body, the valve plug being moveable relative to the valve body between a closed position and an open position, the valve plug being adapted for engagement with the valve body in a manner to prevent fluid flow through the valve body when the valve plug is in the closed position, the valve body being adapted to permit fluid flow in a downstream direction from the upstream opening to the downstream opening through the valve body when the valve plug is in the open position; and
   a pressure regulating conduit connected to the valve body, the pressure regulating conduit being adapted for introducing a gas into the hollow interior of the valve body, the pressure regulating conduit projecting inwardly into the hollow interior of the valve body beyond the hollow interior surface of the valve body, the pressure regulating conduit having a discharge end that is positioned in the hollow interior of the valve body, the discharge end having a discharge opening that faces toward the downstream opening of the valve body.

2. The valve assembly of claim 1 wherein the valve body and the valve plug are adapted to direct fluid flowing through the valve body along a fluid flow path when the valve plug is in the open position, the pressure regulating discharge end being positioned within the fluid flow path.

3. The valve assembly of claim 1 wherein the pressure regulating conduit and the valve body are of a monolithic construction.

4. The valve assembly of claim 1 wherein the pressure regulating conduit extends through a wall of the valve body in a manner so that the hollow interior of the valve body is in fluid communication with atmospheric air surrounding an exterior of the valve body.

5. The valve assembly of claim 1 wherein the pressure regulating conduit is mounted to the valve body in a manner so that the discharge end of the pressure regulating conduit is positioned between the valve plug and the downstream opening of the valve body.

6. The valve assembly of claim 5 wherein the valve body includes a valve seat and the valve plug includes a sealing member, the sealing member being adapted for engagement with the valve seat in a manner to prevent fluid flow through the valve body when the valve plug is in the closed position, the sealing member being disengaged from the valve seat when the valve plug is in the open position to thereby permit fluid flow through the valve body, the discharge end of the pressure regulating conduit being positioned adjacent a downstream side of the valve seat.

7. The valve assembly of claim 6 wherein the valve plug is adapted for rotating movement relative to the valve body between the closed and open positions.

8. The valve assembly of claim 7 wherein the sealing member of the valve plug follows a generally arcuate operating path as the valve body rotates between the closed and open positions, the discharge end of the pressure regulating conduit being positioned immediately downstream of said arcuate operating path.

9. The valve assembly of claim 1 wherein the discharge end of the pressure regulating conduit has a generally V-shaped cross-sectional configuration.

10. The valve assembly of claim 1 wherein the discharge end of the pressure regulating conduit has a generally U-shaped cross-sectional configuration.

11. A valve assembly comprising:
    a valve body having an upstream opening, a downstream opening, and a hollow interior between the upstream and downstream openings;
    a valve plug mounted within the hollow interior of the valve body between the upstream and downstream openings, the valve plug being rotatable about an axis relative to the valve body between closed and open positions, the valve plug being adapted for engagement with the valve body in a manner to prevent fluid flow through the valve body when the valve plug is in the closed position, the valve plug and the valve body being adapted to direct a flow of fluid in a downstream direction from the upstream opening to the downstream opening along a fluid flow path when the valve plug is in the open position, the valve plug having a first portion and a second portion on opposite sides of the axis, the first portion moves arcuately toward the downstream opening and the second portion moves arcuately toward the upstream opening when the valve plug is moved from the closed position toward the open position; and
    a pressure regulating conduit mounted to the valve body, the pressure regulating conduit being adapted for introducing a gas into the hollow interior of the valve body, the pressure regulating conduit projecting inwardly into the hollow interior of the valve body beyond the hollow interior surface of the valve body, the pressure regulating conduit having a discharge end that is positioned in the hollow interior of the valve body closer to the first portion of the valve plug than to the second portion of the valve plug.

12. The valve assembly of claim 11 wherein the valve plug has an inlet port, a discharge port, and a hollow passage through the valve plug connecting the inlet port and the discharge port, the valve plug being adapted to direct the flow of fluid from the upstream opening of the valve body through the hollow passage of the valve plug from the inlet port to the discharge port when the valve plug is in the open position.

13. The valve assembly of claim 12 wherein the pressure regulating conduit is mounted to the valve body in a manner so that the discharge end of the pressure regulating conduit is positioned adjacent the discharge port of the valve plug.

14. The valve assembly of claim 13 wherein the pressure regulating conduit includes a discharge opening at the discharge end, the discharge end being configured so that the discharge opening generally faces in the downstream direction.

15. The valve assembly of claim 13 wherein the valve body includes a valve seat and the valve plug includes a sealing member, the sealing member being adapted for engagement with the valve seat in a manner to prevent fluid flow through the valve body when the valve plug is in the closed position, the sealing member being disengaged from the valve seat when the valve plug is in the open position to thereby permit fluid flow the through the valve body along the fluid flow path, the discharge end of the pressure regulating conduit being positioned adjacent a downstream side of the valve seat.

16. The valve assembly of claim 15 wherein the sealing member of the valve plug follows a generally arcuate operating path as the valve body rotates between the closed and open positions, the discharge end of the pressure regulating conduit being positioned immediately downstream of said arcuate operating path.

17. The valve assembly of claim 11 wherein the pressure regulating conduit and the valve body are of a monolithic construction.

18. The valve assembly of claim 11 wherein the pressure regulating conduit extends through a wall of the valve body in a manner so that the hollow interior of the valve body is in fluid communication with atmospheric air surrounding an exterior of the valve body.

19. A valve assembly comprising:

a valve body having an upstream opening, a downstream opening, and a hollow interior between the upstream and downstream openings, the hollow interior being defined by an interior surface of the valve body;

a valve plug mounted within the hollow interior of the valve body between the upstream and downstream openings, the valve plug being rotatable about an axis relative to the valve body between closed and open positions, the valve plug being adapted for engagement with the valve body in a manner to prevent fluid flow through the valve body when the valve plug is in the closed position, the valve plug and the valve body being adapted to direct a flow of fluid in a downstream direction from the upstream opening to the downstream opening along a fluid flow path when the valve plug is in the open position, the valve plug having a first portion and a second portion on opposite sides of the axis, the first portion moves arcuately toward the downstream opening and the second portion moves arcuately toward the upstream opening when the valve plug is moved from the closed position toward the open position; and a pressure regulating conduit mounted to the valve body, the pressure regulating conduit being adapted to introduce a gas into the hollow interior of the valve body, the pressure regulating conduit having a discharge end that projects beyond the hollow interior of the valve body and is located in the hollow interior of the valve body closer to the first portion of the valve plug than to the second portion of the valve plug, and the pressure regulating conduit has a discharge end with a discharge opening that faces toward the downstream opening.

20. The valve assembly of claim 19 wherein the discharge end of the pressure regulating conduit has a generally V-shaped cross-sectional configuration.

21. The valve assembly of claim 19 wherein the discharge end of the pressure regulating conduit has a generally U-shaped cross-sectional configuration.

* * * * *